United States Patent [19]

Monden et al.

[11] Patent Number: 4,508,495

[45] Date of Patent: Apr. 2, 1985

[54] ROTARY SHAFT FOR COMPRESSOR

[75] Inventors: Tsuneo Monden, Tokyo; Masao Ozu, Fuji; Satoshi Ikegami, Kawasaki, all of Japan

[73] Assignee: Tokyo Shibaura Denki Kabushiki Kaisha, Kawasaki, Japan

[21] Appl. No.: 567,345

[22] Filed: Dec. 30, 1983

[30] Foreign Application Priority Data

Jan. 18, 1983 [JP] Japan ................................. 58-6411

[51] Int. Cl.³ .......................... F04C 2/00; B23K 26/00
[52] U.S. Cl. .......................................... 418/63; 418/91; 219/121 LC; 219/121 LD; 74/434; 29/525; 416/213 A
[58] Field of Search ................ 415/175; 219/121 LC, 219/121 LD, 121 EC, 121 ED; 418/91, 63; 417/902; 74/434; 29/525; 416/213 R, 213 A

[56] References Cited

U.S. PATENT DOCUMENTS

| 3,311,292 | 3/1967 | Connor | 415/175 |
| 3,694,616 | 9/1972 | Brealey | 219/121 ED |
| 3,949,186 | 4/1976 | Nakayama et al. | 219/121 LC |
| 4,242,065 | 12/1980 | Ishizuka et al. | 418/91 |

FOREIGN PATENT DOCUMENTS

| 129553 | 11/1976 | Japan . |
| 77316 | 6/1979 | Japan . |
| 172688 | 5/1980 | Japan . |

*Primary Examiner*—Robert E. Garrett
*Assistant Examiner*—H. Edward Li
*Attorney, Agent, or Firm*—Cushman, Darby & Cushman

[57] ABSTRACT

A rotary shaft for compressor includes a cylindrical shaft body and a cylindrical eccentric member. The shaft body is rotatably arranged in an outer box of the compressor and is connected to an electric motor at one end portion thereof. The eccentric member has a through hole extending along the axis thereof and formed eccentric thereto, and also has a groove extending from the upper end face to the lower end face thereof to form a passage for lubrication oil. The groove is provided with a bottom face adjacent to the shaft body. The shaft body is inserted into the through hole. The eccentric member is secured to the other end portion of the shaft body by laser-welding the bottom of the groove to the shaft body. An annular eccentric roller is rotatably fitted onto the eccentric member.

4 Claims, 5 Drawing Figures

ROTARY SHAFT FOR COMPRESSOR

BACKGROUND OF THE INVENTION

The present invention relates to a rotary shaft for a compressor.

Generally, a compressor of the closed type, for example, has a closed outer box in which electromotor and compressor sections are included. In addition, the outer box includes a rotary shaft which has a cylindrical rotary shaft body and an eccentric crank. A rotor in the electromotor section is secured to one end portion of the rotary shaft, and the eccentric crank is located in a compression chamber of the compressor section. An annular eccentric roller is fitted around the eccentric crank.

Conventionally, the eccentric crank is integrally formed, with the shaft body, or it is formed apart from the shaft body and is then secured to the shaft body by shrinkage fit, pressure fit, bonding or the like.

When the eccentric crank is integrally formed with the shaft body, it is made by casting or forging. Its materials are therefore limited in number and its manufacturing cost is substantially increased. When the eccentric crank is formed apart from the shaft body and is then secured to the shaft body by shrinkage fit, the dimensions of the rotary shaft may be changed, due to thermal influence, i.e., due to the residual stress caused by heating. In cases of pressure-fitting, there is the danger that the shaft body or eccentric crank might be deformed, damaging the outer circumference of the shaft body, as a result of resistance to the fitting pressure. In cases of bonding, the eccentric crank would be low in strength and lacking in reliability.

However, in the case of being separately formed, the cost is lower than in the case of being integrally formed. It is therefore desirable that a rotary shaft formed apart from the eccentric crank by provided, eliminating the disadvantages caused when the eccentric crank is secured to the shaft body.

SUMMARY OF THE INVENTION

Thus, the object of the present invention is to provide a rotary shaft for a compressor which is free from any dimensional error and deformation in the process of manufacture, high in mechanical strength, and enables the free selection of materials.

The inventor has paid due attention to laser treatment. Laser beams irradiated from the laser gun are parallel beams which are excellent in interference capacity; may be guided by reflection mirrors to any point remote from the laser gun; and may be focussed on a spot of micro-diameter through optical lenses. Light power density at this beam spot reaches substantially $10^5$–$10^8 W/cm^2$, and any material to be treated may be fused and evaporated instantly, when it is located adjacent to or at the beam spot. In short, it has been found that the essence of such laser treatment resides in a heat treatment which is most suitable for welding. Advantages of laser treatment are: (1) thermal influence on the material to be treated can be greatly suppressed, to reduce deflection in the material, since heating can be limited to a local point; (2) no influence is exerted on any other element adjacent to the treatment spot of the material, which may be sensitive to heat; (3) any portion of the material which normally rejects any access may be welded, since no physical contact is needed between the material and the laser gun; (4) no X-ray is generated; and (5) the treatment process may be automated.

According to an aspect of the present invention, there is provided a rotary shaft which comprises a cylindrical shaft body rotatably arranged within an outer box of the compressor and connected at its one end portion to a driving means of the compressor; a cylindrical eccentric member having a through-hole extending along the axis of the eccentric member and being eccentric in relation to the axis of the eccentric member, into which through-hole the other end portion of the shaft body is inserted, and also having a groove extending from one end face to the other end face of the eccentric member to form a passage through which lubrication oil flows and being provided with a bottom face adajcent to the shaft body, the eccentric member being secured to the other end of the shaft body by laser-welding the bottom face of the groove to the shaft body and being accommodated within a compression chamber of the compressor; and an annular eccentric roller arranged within the compression chamber and rotatably fitted around the eccentric member. As may be seen from the above, the eccentric member has a groove and is secured to the shaft body by laser-welding the bottom face of this groove. As described above, thermal influence can be greatly suppressed, in relation to the shaft body and the eccentric member, and no deflection is caused in cases where laser treatment is used. Accordingly, the rotary shaft may be kept accurate in its dimensions and has satisfactory mechanical strength. In addition, the shaft body and the eccentric member are not deformed at the time of manufacture. Further, the groove formed in the eccentric member serves as the passage of lubrication oil, thereby enabling the rotary shaft to be fully lubricated.

DETAILED DESCRIPTION OF THE PREFERRED EMBODIMENTS

Embodiments of the present invention will now be described in detail with reference to the accompanying drawings.

Figure 1:
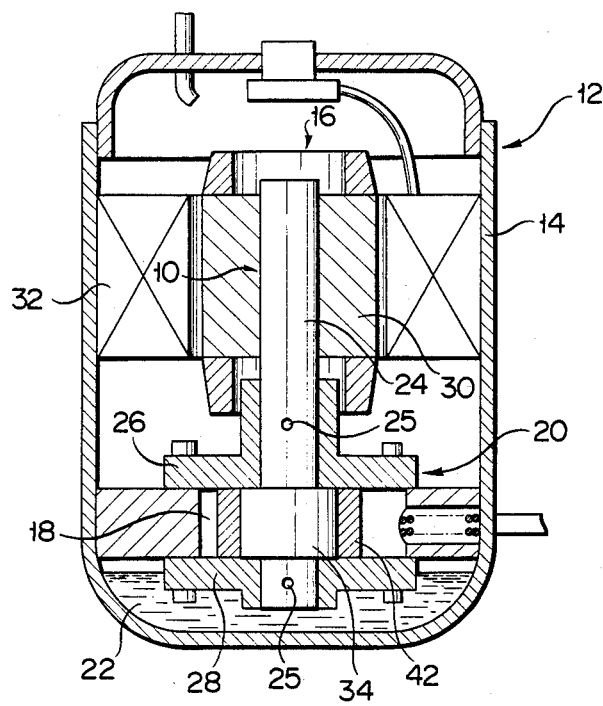
FIG. 1 is a longitudinal sectional view of a compressor which is provided with a rotary shaft according to an embodiment of the present invention.

FIG. 1 shows a compressor 12 of the closed type, which is provided with a rotary shaft 10 according to one embodiment of the present invention. The compressor 12 includes an outer box 14, an electromotor section 16 which is arranged in the outer box 14 and serves as means for driving the rotary shaft 10, and a compression section 20 arranged within the outer body 14 and having a compression chamber 18. Lubrication oil 22 is stored under the compression section 20 within the outer box 14.

Figure 2:
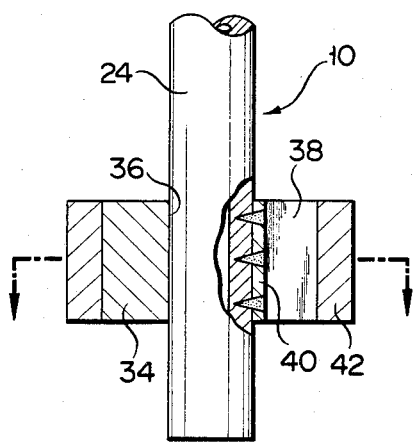
FIG. 2 is a partially broken down side view of the rotary shaft.
Figure 3:
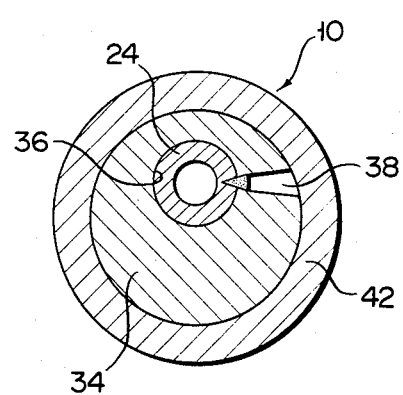
FIG. 3 is a sectional view taken along a line III—III in FIG. 2.

As shown in FIGS. 1 through 3, the rotary shaft 10 has a cylindrical shaft body 24 rotatably supported by bearings 26, 28 which form a part of the compression section 20. A rotor 30 of the electromotor section 16 is secured to the upper end portion of the shaft body 24, and a stator 32 of the electromotor section is secured, outside of the rotor 30, to the outer box 14. The shaft body 24 has two holes 25 for lubrication oil, which are formed in that portions thereof which are located in the bearings 26, 28, respectively.

A cylindrical eccentric crank 34 is secured to the lower end portion of the shaft body 24. This eccentric crank 34 has a through-hole 36 extending along and eccentrically formed in relation to the axis thereof. The lower end portion of the shaft body 24 is inserted into the through-hole 36. The eccentric crank 34 also has a groove 38 extending along the axis of the shaft body 24 from the upper end face to the lower end face of the eccentric crank 34. The groove 38 also-extends from the outer circumference of the eccentric crank 34 to the adjacencies of the shaft body 24. In short, the groove 38 has a bottom face 40 adjacent to the through-hole 36. The groove 38 forms a passage through which lubrication oil flows. The eccentric crank 34 is secured to the lower end portion of the shaft body 24 by laser-welding the bottom of the groove 38 to the shaft body 24 at three points, for example.

An annular eccentric roller 42 is rotatably fitted onto the eccentric crank 34. The eccentric crank 34 and the roller 42 are located in the compression chamber 18 of the compression section 20, and are rotated in accordance with the rotation of the shaft body 24 to compress coolant within the compression chamber. Following the rotation of the rotary shaft 10, lubrication oil 22 is introduced between the shaft body 24 and the bearing 28 through the inner hole of the shaft body and the lower hole 25, and further, between the eccentric crank 34 and the eccentric roller 42 through the groove 38, and between the shaft body and the bearing 26 through the inner hole and the upper hole 25.

The rotary shaft 10 having the construction described above can be manufactured as follows:

A shaft body 24 and an eccentric crank 34 are provided, being formed separately. It is unnecessary for the shaft body 24 and the eccentric crank 34 to be made of same material, but materials which are suitable for their objects may be selected. The through-hole 36 and the groove 38 are then formed in the eccentric crank 34. The diameter of the through-hole 36 is made a little larger than that of the shaft body 24. The shaft body 24 is freely fitted into the through-hole 36 and temporarily fixed thereto. The eccentric crank 34 is then secured to the shaft body 24 by laser-welding the bottom of the groove 38 to the shaft body 24.

Figure 4:
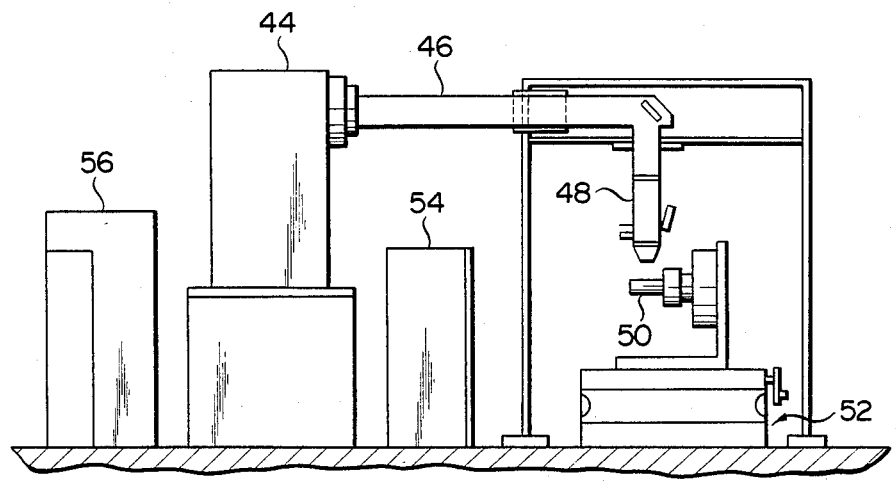
FIG. 4 is a view schematically showing a laser welding apparatus employed to manufacturing the rotary shaft.

The laser welding may be performed by the well-known $CO_2$ laser welding apparatus shown in FIG. 4, for example. The apparatus includes a laser gun 44, a laser beam transmitting system 46, an optical system 48 for focussing laser beams, a worktable 52 provided with a rotary jig 50, a control means 54 and an electric source unit 56. The laser beam gun 44 radiates laser beams by circulating $CO_2$ gas within a vacuum container and discharging it with a total reflection mirror and partial reflection mirror arranged opposite each other. The shaft body 24 and the eccentric crank 34 temporarily attached to each other are secured to the jig 50. The laser beams are then irradiated from the laser gun 44. The laser beams are transmitted to the optical system 48 through the transmitting system 46 and are then focussed. The laser beams are irradiated onto the bottom face 40 of the groove 38 through the groove 38 from outside the eccentric crank 34. The laser beams are so focussed as to have diameter of about 2 mm on the bottom face 40. The bottom of the groove 38 and the shaft body 24 are thus locally heated and those portions thereof which are irradiated by the laser beams are fused for a short time period. After the irradiation of the laser beams is halted, the fused portions cool and are welded to each other.

Since the shaft body 24 and the eccentric crank 34 are locally heated at the time of laser-welding, no thermal influence is exerted, except on the welded portions. Therefore, no deflection because of heat is caused in both of the shaft body 24 and the eccentric crank 34 at the time of laser-welding. Since the shaft body 24 and the through-hole 36 are idly engaged with each other, both of the shaft body 24 and the eccentric crnak 34 are not deformed at the time when the shaft body is inserted into the through-hole. Although the upper and lower peripheral edge portions of the through-hole 36 may conceivably be laser-welded to the shaft body 24 without forming the groove 38 in the eccentric crank 34, the welded portions would form projections which would hinder the rotation of the rotary shaft 10. This would necessitate a secondary treatment and is therefore undesirable. According to the embodiment of the present invention, the bottom of the groove 38 is welded to the shaft body 24, thereby preventing the welded portion from hindering the rotation of the rotary shaft 10.

Thereafter, the eccentric roller 42 is fitted onto the eccentric crank 34, to thereby complete the rotary shaft 10.

According to the rotary shaft 10 composed as described above, the eccentric crank 34 is secured to the shaft body 24 by laser welding, to thereby eliminate any error in its dimensions, as well as any deformation, and ensure satisfactory mechanical strength. Further, the eccentric crank 34 has a groove 38 which serves as the passage of lubrication oil, thus enhancing the lubricating efficiency of the rotary shaft 10.

Figure 5:
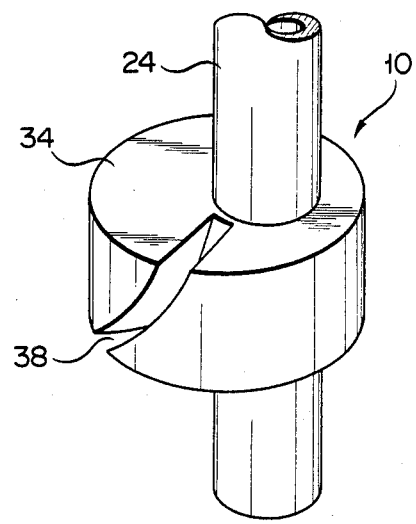
FIG. 5 is a perspective view showing a rotary shaft according to a modification of the present invention.

It should be understood that the present invention is not limited to the above-described embodiment and various modifications may be made within the spirit and scope of the invention. As shown in FIG. 5, for example, the groove 38 may be formed in such a way as to be oblique with respect to the axial direction of the shaft body 24.

What is claimed is:

1. A rotary shaft for a compressor which includes an outer box, driving means arranged within the outer box to drive the rotary shaft, and a compression section arranged within the outer box and having a compression chamber, comprising:

a cylindrical shaft body rotatably arranged within the outer box and connected to the driving means at one end portion thereof;

a cylindrical eccentric member having a through-hole extending along the axis thereof and formed eccentric thereto, and also having a groove extending from one end face to the other end face of the eccentric member to form a passage for lubrication oil, being provided with a bottom face adjacent to the shaft body, the shaft body being inserted into the through-hole and the eccentric member being secured to the other end portion of the shaft body by laser-welding the bottom of the groove to the shaft body, and being housed within the compression chamber; and an annular eccentric roller arranged within the compression chamber and rotatably fitted onto the eccentric member to compress coolant within the compression chamber in accordance with the rotation of the shaft body.

2. A rotary shaft according to claim 1, wherein said groove extends in the axial direction of the shaft body.

3. A rotary shaft according to claim 1, wherein said groove is formed to be oblique with respect to the axial direction of the shaft body.

4. A rotary shaft according to claim 1, wherein the bottom of said groove is laser-welded to the shaft body at a plurality of points.

* * * * *